United States Patent
Harada et al.

(10) Patent No.: US 9,794,767 B2
(45) Date of Patent: Oct. 17, 2017

(54) USER TERMINAL, RADIO COMMUNICATION SYSTEM AND RADIO COMMUNICATION METHOD

(71) Applicant: NTT DOCOMO, INC., Tokyo (JP)

(72) Inventors: Hiroki Harada, Tokyo (JP); Qun Zhao, Beijing (CN); Yongbo Zeng, Beijing (CN); Yongsheng Zhang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/113,463

(22) PCT Filed: Dec. 24, 2014

(86) PCT No.: PCT/JP2014/084158
§ 371 (c)(1),
(2) Date: Jul. 22, 2016

(87) PCT Pub. No.: WO2015/115003
PCT Pub. Date: Aug. 6, 2015

(65) Prior Publication Data
US 2017/0013437 A1    Jan. 12, 2017

(30) Foreign Application Priority Data

Jan. 30, 2014 (JP) ................. 2014-015979

(51) Int. Cl.
| | |
|---|---|
| H04W 72/02 | (2009.01) |
| H04W 8/00 | (2009.01) |
| H04W 72/12 | (2009.01) |
| H04W 40/24 | (2009.01) |
| H04L 5/00 | (2006.01) |

(Continued)

(52) U.S. Cl.
CPC ............ *H04W 8/005* (2013.01); *H04L 5/00* (2013.01); *H04W 40/244* (2013.01); *H04W 40/246* (2013.01); *H04W 72/02* (2013.01); *H04W 72/1215* (2013.01); *H04L 12/2854* (2013.01); *H04W 88/06* (2013.01)

(58) Field of Classification Search
CPC ........................... H04W 72/02; H04W 72/12
See application file for complete search history.

(56) References Cited

U.S. PATENT DOCUMENTS

| | | | | |
|---|---|---|---|---|
| 2009/0016249 | A1* | 1/2009 | Li | H04J 3/0638 370/310.1 |
| 2014/0112235 | A1* | 4/2014 | Jung | H04W 48/16 370/312 |
| 2015/0043438 | A1* | 2/2015 | Fwu | H04W 28/24 370/329 |

OTHER PUBLICATIONS

International Search Report issued in corresponding application No. PCT/JP2014/084158 dated Mar. 17, 2015 (3 pages).

(Continued)

*Primary Examiner* — Tuan H Nguyen
(74) *Attorney, Agent, or Firm* — Osha Liang LLP (57) ABSTRACT

To enable a user terminal that receives a discovery signal of another user terminal for performing Type 1 discovery to synthesize and receive the discovery signal, a user terminal capable of executing inter-terminal direct signal transmission/reception has a selecting section that selects a discovery signal transmission resource at the next period for each period, and a transmission section that transmits information on the discovery signal transmission resource at the next period, together with the discovery signal.

7 Claims, 9 Drawing Sheets

(51) Int. Cl.
*H04L 12/28* (2006.01)
*H04W 88/06* (2009.01)

(56) References Cited

OTHER PUBLICATIONS

Written Opinion of the International Searching Authority issued in corresponding application No. PCT/JP2014/084158 dated Mar. 17, 2015 (3 pages).
Balazs Bertenyi, "Key Drivers for LTE success: Services Evolution"; 3GPP Seminar, LTE Asia; Sep. 6, 2011 (15 pages).

* cited by examiner

USER TERMINAL, RADIO COMMUNICATION SYSTEM AND RADIO COMMUNICATION METHOD

TECHNICAL FIELD

The present invention relates to a user terminal, radio communication system and radio communication method in the next-generation mobile communication system.

BACKGROUND ART

In LTE (Long Term Evolution) and a successor system (for example, also referred to as LTE-Advanced, FRA (Future Radio Access), 4G and the like) to LTE, D2D (Device to Device) techniques have been studied in which user terminals directly transmit and receive signals to/from one another by bypassing a radio base station (for example, Non-patent Document 1).

In inter-terminal direct signal transmission/reception (D2D signal transmission/reception), the user terminal performs D2D discovery to discover another communicable user terminal and inter-terminal communication (D2D communication). In D2D discovery, based on a resource designation method for discovery signal transmission, Type 1 (collision type) discovery and Type 2 (non-collision Type) discovery have been studied.

CITATION LIST

Non Patent Literature

Non-Patent Literature 1: "Key drivers for LTE success: Services Evolution", 2011 September, 3GPP, Internet URL: http://www.3gpp.org/ftp/Information/presentations/presentations_2011/2011_09_LTE_Asia/2011_LTE-Asia_3GPP_Service_evolution.pdf

SUMMARY OF INVENTION

Technical Problem

In Type 1 discovery, a user terminal that transmits a discovery signal autonomously selects a discovery signal transmission resource based on a particular determination criterion for each period. It is difficult for a user terminal that receives a discovery signal at some period to know a resource position to which the same discovery signal is assigned at the next period, and therefore, the user terminal is not capable of synthesizing and receiving the discovery signal.

The present invention was made in view of such a respect, and it is an object of the invention to provide a user terminal, radio communication system and radio communication method for enabling a user terminal that receives a discovery signal transmitted from another user terminal for performing Type 1 discovery to synthesize and receive the discovery signal.

Solution to Problem

A user terminal of the present invention is a user terminal capable of executing inter-terminal direct signal transmission/reception, and is characterized by having a selecting section that selects a discovery signal transmission resource at a next period for each period, and a transmission section that transmits information on the discovery signal transmission resource at the next period, together with a discovery signal.

Advantageous Effects of Invention

According to the present invention, a user terminal that receives a discovery signal transmitted from another user terminal for performing Type 1 discovery is capable of synthesizing and receiving the discovery signal.

DESCRIPTION OF EMBODIMENTS

An Embodiment of the present invention will specifically be described below with reference to drawings.

Figure 1:
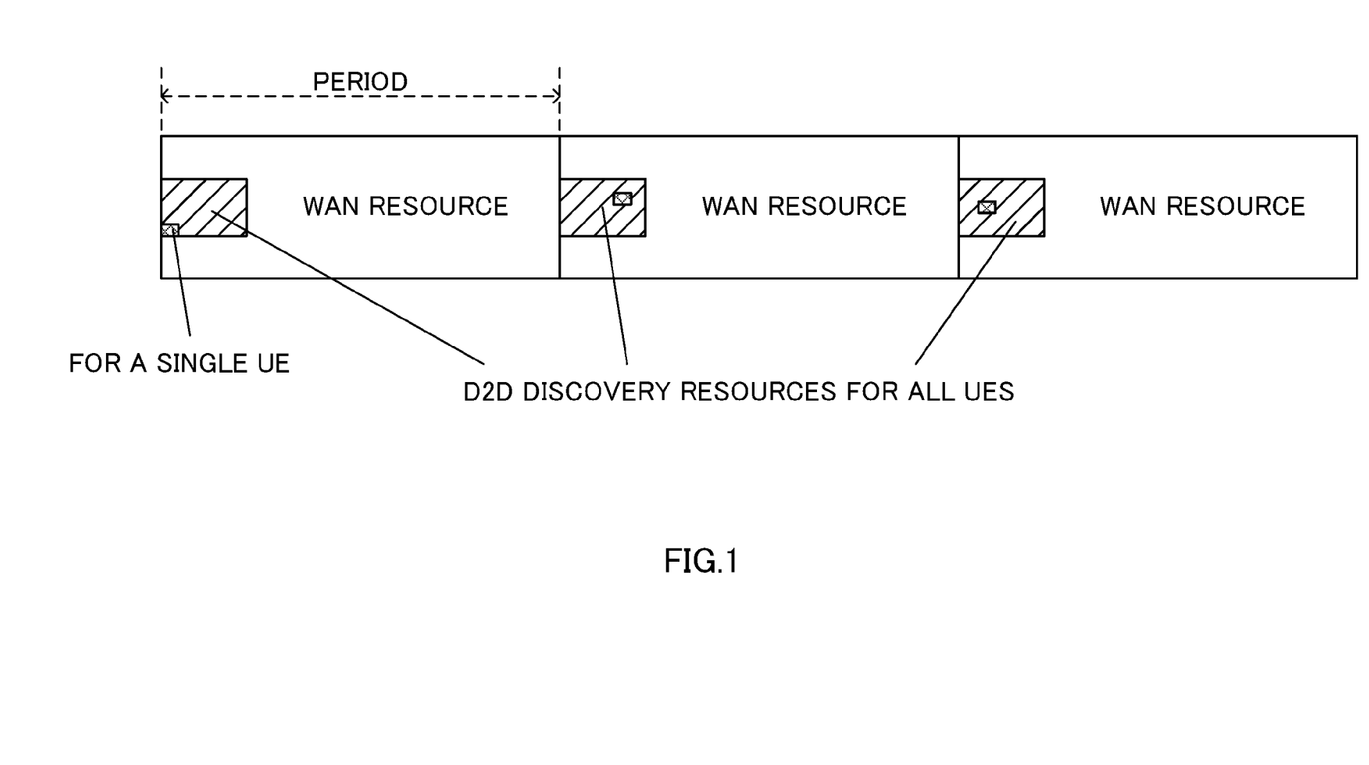
FIG. 1 is a conceptual diagram of a D2D discovery resource group that is a discovery signal transmission resource group in D2D discovery.

FIG. 1 is a conceptual diagram of a D2D discovery resource group that is a discovery signal transmission resource group in D2D discovery. As shown in FIG. 1, a periodical uplink (UL) resource group is assigned as the D2D discovery resource group in a quasi-static manner. The D2D discovery resource group is divided into time-frequency resources. The D2D discovery resource group includes Type 1 resource group and Type 2 resource group to be comprised thereof.

In Type 1 discovery, a network notifies a user terminal of a resource group for enabling a discovery signal to be transmitted. Each user terminal selects a discovery signal transmission resource of the terminal autonomously, for example, randomly from the notified resource group. In Type 1 discovery, since each user terminal autonomously selects the discovery signal transmission resource, there is the risk that discovery signal transmission resources collide with each other between user terminals. Accordingly, Type 1 discovery is also called the collision type.

In Type 2 discovery, the network notifies of a resource to transmit the discovery signal for each user terminal. Each user terminal uses the designated discovery signal transmission resource to transmit the discovery signal. In Type 2 discovery, since the network designates the discovery signal transmission resource for each user terminal to use, discovery signal transmission resources do not collide with each other between user terminals. Accordingly, Type 2 discovery is also called the non-collision type.

In Type 2 discovery, since the network needs to notify each user terminal of an individual discovery signal transmission resource, a connection state between the network and the user terminal requires an RRC (Radio Resource Control) connected state. On the other hand, in Type 1 discovery, when the Type 1 resource group is broadcast, the connection state between the network and the user terminal may be an RRC idle state.

The present description is based on the premise that user terminals execute Type 1 discovery.

As shown in FIG. 1, in Type 1 discovery, each user terminal selects a discovery signal transmission resource of the terminal autonomously from the D2D discovery resource group notified to all user terminals that perform D2D discovery. In other words, each user terminal selects time-frequency resources for discovery signal transmission autonomously, for example, randomly from the D2D discovery resource group for each period.

The user terminal transmitting the discovery signal transmits the same discovery signal at each period. The user terminal receiving the discovery signal synthesizes and receives these discovery signals, and is thereby capable of improving the detection probability.

To synthesize and receive the discovery signal, the user terminal receiving the discovery signal at some period needs to know a position of a resource in which the same discovery signal is transmitted at the next period. However, in Type 1 discovery, the user terminal that transmits the discovery signal selects the discovery signal transmission resource autonomously based on a particular determination criterion for each period. Therefore, it is difficult for the user terminal that receives the discovery signal to know the resource position. Accordingly, it is difficult for the user terminal that receives the discovery signal to synthesize and receive.

Therefore, in order to enable a user terminal that receives a discovery signal to synthesize and receive the discovery signal, the inventors of the present invention found out techniques for notifying of a resource position to transmit the same discovery signal at a period (n+1) together, when a user terminal transmits the discovery signal at a period (n). In addition, n is assumed to be an arbitrary natural number.

Figure 2:
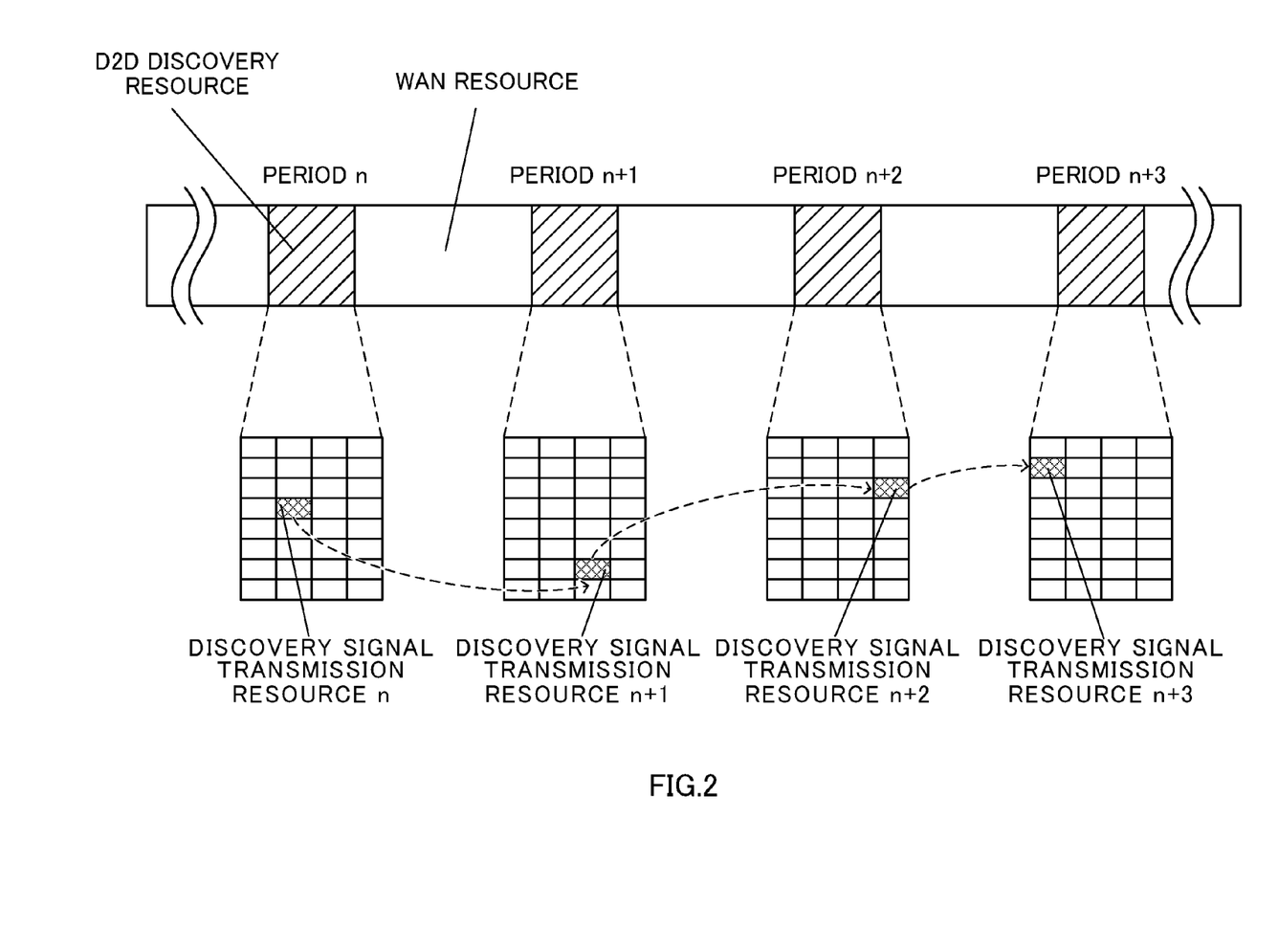
FIG. 2 is a diagram to explain that a user terminal transmits information on discovery signal transmission resource at the next period together with a discovery signal.

As shown in FIG. 2, a user terminal assigns the discovery signal to a discovery signal transmission resource (n) autonomously selected from a D2D discovery resource group based on a particular determination criterion to transmit at a period (n). At this point, information on a discovery signal transmission resource (n+1) at the next period (n+1) is transmitted together with the discovery signal at the period (n). In other words, at the period (n), the user terminal beforehand selects and determines the discovery signal transmission resource (n+1) at the next period (n+1).

At the period (n), a user terminal, which receives the discovery signal transmitted from some user terminal, is capable of knowing the discovery signal transmission resource (n+1) at the period (n+1) of the same user terminal. By this means, the user terminal on the receiving side is capable of synthesizing and receiving a plurality of discovery signals transmitted from the same user terminal at different periods, and the discovery signal detection probability is improved.

Similarly, at the period (n+1), the user terminal on the transmitting side selects and determines a discovery signal transmission resource (n+2) at the next period (n+2). Then, the user terminal on the transmitting side assigns the discovery signal and information on the discovery signal transmission resource (n+2) to the discovery signal transmission resource (n+1) to transmit. While receiving the discovery signal transmitted from some user terminal at the period (n+1), the user terminal on the receiving side receives the information on the discovery signal transmission resource (n+2) at the next period (n+2) of the same user terminal.

Further, at the period (n+2), the user terminal on the transmitting side selects and determines a discovery signal transmission resource (n+3) at the next period (n+3). Then, the user terminal on the transmitting side assigns the discovery signal and information on the discovery signal transmission resource (n+3) to the discovery signal transmission resource (n+2) to transmit. While receiving the discovery signal transmitted from some user terminal at the period (n+2), the user terminal on the receiving side receives the information on the discovery signal transmission resource (n+3) at the next period (n+3) of the same user terminal.

Described next is a method in which the user terminal notifies of information on discovery signal transmission resource at the next period together in transmitting the discovery signal at some period. For example, the information on discovery signal transmission resource at the next period includes information on a position of the discovery signal transmission resource at the next period.

Figure 3A:
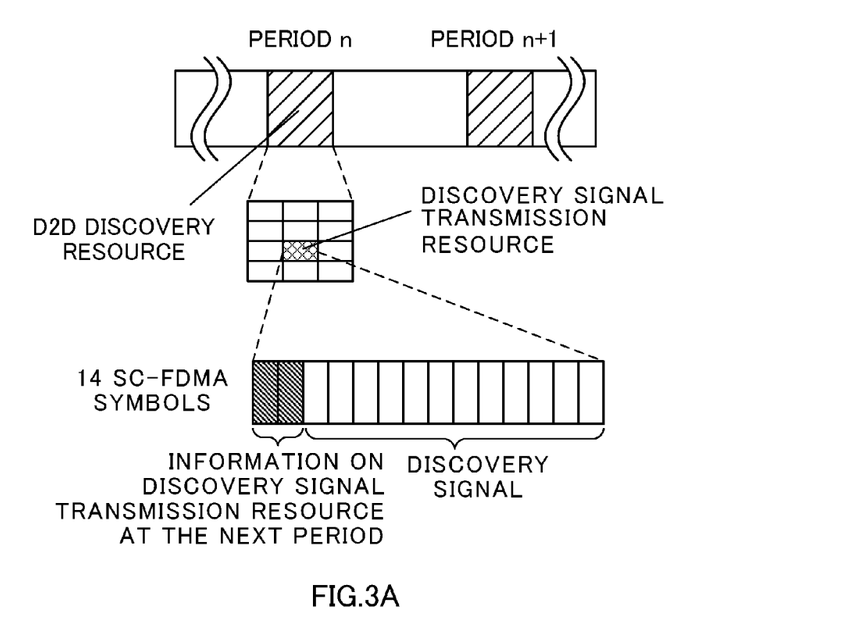
FIG. 3 contains diagrams to explain a method of notifying of the information on discovery signal transmission resource at the next period together when the user terminal transmits the discovery signal.

In a first method of notifying of the information on discovery signal transmission resource at the next period, the user terminal notifies of the information on discovery signal transmission resource at the next period in the same resource as the resource to transmit the discovery signal (see FIG. 3A). As shown in FIG. 3A, the user terminal selects a discovery signal transmission resource from the D2D discovery resource group, and assigns the discovery signal and information on discovery signal transmission resource at the next period to the resource to transmit.

For example, among 14 SC-FDMA (Single-Carrier Frequency-Division Multiple Access) symbols as shown in FIG. 3A, the user terminal transmits the information on discovery signal transmission resource at the next period using 2 symbols, and using 12 symbols, transmits an information signal obtained by modulating the ID of the terminal and the like as the discovery signal.

Figure 3B:
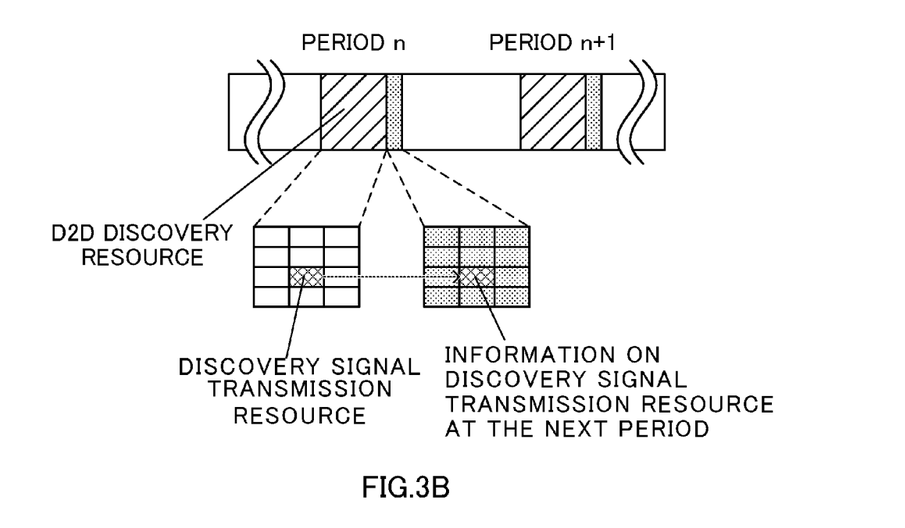

In a second method of notifying of the information on discovery signal transmission resource at the next period, the user terminal notifies of the information on discovery signal transmission resource at the next period in a resource different from a resource to transmit the discovery signal (see FIG. 3B). As shown in FIG. 3B, the user terminal selects a discovery signal transmission resource from the D2D discovery resource group, and assigns the discovery signal to the resource to transmit. Further, the user terminal assigns the information on discovery signal transmission resource at the next period to a resource of a resource group independent of the D2D discovery resource group. For example, the network notifies the user terminal of the independent resource group.

In the independent resource group, the resource for the user terminal to assign and transmit the information on discovery signal transmission resource at the next period is implicitly indicated. As shown in FIG. 3B, the D2D discovery resource group and the independent resource group are divided so that the numbers of vertical and horizontal resources are the same. The D2D discovery resource group is divided on a basis of a resource block where vertical resources indicate subcarriers, and horizontal resources indicate subframes. The independent resource group may be divided on the same basis as the basis of the D2D discovery resource group, or may be divided on a basis smaller than that of the D2D discovery resource group.

Then, a position of the resource for the user terminal to transmit the discovery signal in the D2D discovery resource group and a position of the resource to transmit the information on discovery signal transmission resource at the next period in the independent resource group are made corresponding positions in both of the resource groups. By this means, the user terminal receiving the discovery signal is capable of implicitly knowing the resource position to which the information on discovery signal transmission resource at the next period is assigned in the independent resource group. Accordingly, the user terminal transmitting the discovery signal does not need to notify of the resource position to which the information on discovery signal transmission resource at the next period is assigned in the independent resource group together, in notifying of the discovery signal. Therefore, the information amount does not increase in transmitting the discovery signal.

Alternatively, in order to obtain frequency diversity, the user terminal may shift the resource position to assign and transmit the information on discovery signal transmission resource at the next period in the independent resource group in the frequency domain according to a beforehand notified rule, with respect to the resource position to assign and transmit the discovery signal in the D2D discovery resource group.

In the above-mentioned first and second methods, in order for the user terminal on the receiving side to synthesize and receive the transmitted discovery signal, also in the case where the terminal is not able to detect the discovery signal at some period, the terminal needs to be able to detect the information on discovery signal transmission resource at the next period. Therefore, as compared with the discovery signal, the information on discovery signal transmission resource at the next period is required to be a signal easy to detect.

As a signal to transmit the information on discovery signal transmission resource at the next period, the user terminal is capable of using a preamble sequence signal that is a signal having excellent detection performance, as compared with a normal modulation signal to transmit the discovery signal. For example, the user terminal is capable of using a preamble sequence signal of a sequence pattern of a demodulation reference signal such as a DMRS (DeModulation Reference Signal) pattern, a sequence pattern of a synchronization signal such as a PD2DSS (Physical D2D Synchronization Signal) pattern, a new preamble sequence pattern or the like, for notification of the information on discovery signal transmission resource at the next period.

Further, as the signal to transmit the information on discovery signal transmission resource at the next period, the user terminal is capable of using a signal that is the same modulation signal as the signal to transmit the discovery signal and that has an extremely low coding rate.

Described next is a method of decreasing the number of information bits when the user terminal notifies of the information on discovery signal transmission resource at the next period together with the discovery signal. As the signal to notify of the information on discovery signal transmission resource, as described previously, it is considered using the preamble sequence signal and modulation signal with a low coding rate. In both of the cases, it is desirable that resources e.g. the number of OFDM symbols used to transmit the signal are few, and therefore, it is necessary to control the number of information bits to notify of the information on discovery signal transmission resource to be few. In order to decrease the number of information bits in notifying of the information on discovery signal transmission resource at the next period together with the discovery signal, it is essential only that the resource region for the user terminal to select the discovery signal transmission resource is limited to a small region.

For example, it is assumed that the size of a periodical D2D discovery resource group for the network to notify the user terminal is 44×64 [RB]. In this case, when the user terminal selects and obtains all resources as candidates for the next-period transmission resource, 12 bits are required to notify of the information on discovery signal transmission resource at the next period.

Figure 4A:
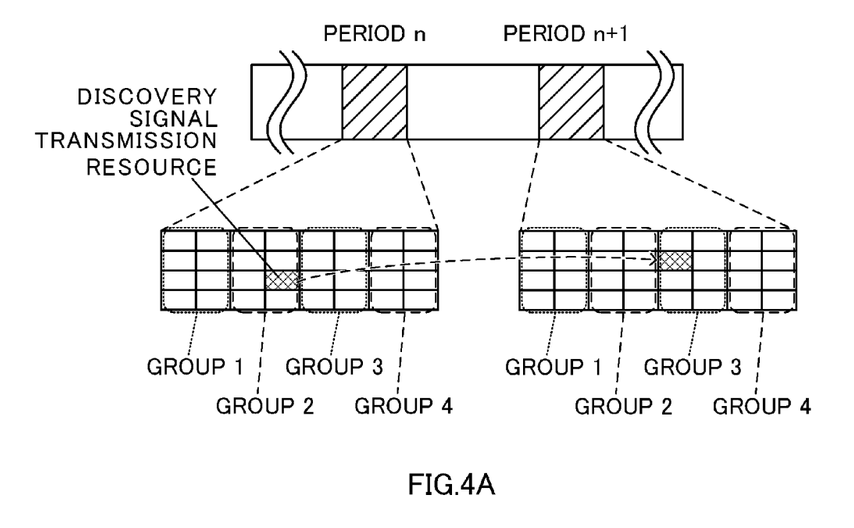
FIG. 4 contains diagrams to explain a method of decreasing the number of information bits when the user terminal notifies of the information on discovery signal transmission resource at the next period together with the discovery signal.

In a first method of decreasing the number of information bits in notifying of the information on discovery signal transmission resource at the next period, the D2D discovery resource group is divided into an arbitrary number of sub-groups, and the user terminal selects a discovery signal transmission resource inside a single sub-group for each period autonomously based on a particular determination criterion (see FIG. 4A). In addition, the method of dividing into sub-groups is not limited to the method of dividing in the time domain as shown in FIG. 4A, and for example, may be divided in the frequency domain.

In the example as shown in FIG. 4A, the D2D discovery resource group at one period is divided into four sub-groups. In transmitting the discovery signal at a period (n), the user terminal notifies also of resource information inside Group 3 to transmit the same discovery signal at a period (n+1) together. In this case, since the size of Group 3 is 44×64÷4 [RB], the number of information bits required for the user terminal to notify of the information on discovery signal transmission resource at the next period is "10". In other words, as compared with the case of not dividing into sub-groups, it is possible to decrease the number of information bits required for the user terminal to notify of the information on discovery signal transmission resource at the next period by 2 bits.

Although not shown in the figure, in the case of dividing the resource group at one period into eight sub-groups, since the size per sub-group is 44×64÷8 [RB], the number of information bits required for the user terminal to notify of the information on discovery signal transmission resource at the next period is "9". In other words, as compared with the case of not dividing into sub-groups, it is possible to decrease the number of information bits required for the user terminal to notify of the information on discovery signal transmission resource at the next period by 3 bits.

In the example as shown in FIG. 4A, when it is assumed that the user terminal which selects the discovery signal transmission resource from Group 2 at the period (n) continues to select the discovery signal transmission resource from the same group i.e. Group 2 at each of subsequent periods, in the case where another user terminal, which similarly selects the discovery signal transmission resource from Group 2, exists, the probability that both of the discovery signal transmission resources collide with each other is high. Therefore, a hopping pattern indicating how to select the sub-group may be defined for each user terminal, so that the user terminal selects the discovery signal transmission resource from a different sub-group for each period.

Figure 4B:
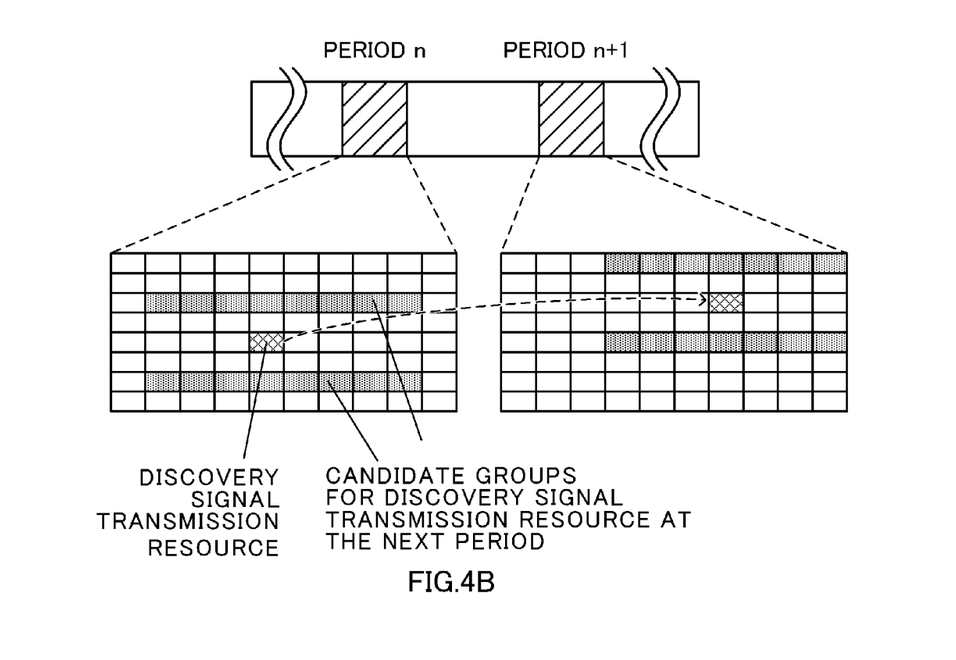

In a second method of decreasing the number of information bits in notifying of the information on discovery signal transmission resource at the next period, the user terminal makes resource groups corresponding to 16 [RB] around the discovery signal transmission resource selected at some period candidates for selection of the next-period discovery signal transmission resource (see FIG. 4B). The resource positions corresponding to 16 [RB] that are candidates for the discovery signal transmission resource at the next period are relative positions beforehand defined with respect to the discovery signal transmission resource position selected at some period. In addition, resources that are candidates for the discovery signal transmission resource at the next period are not limited to 16 [RB], and it is possible to increase or decrease the number of candidate resources.

The user terminal autonomously selects and determines the discovery signal transmission resource at the next period from the resource groups corresponding to 16 [RB] that are candidates based on the particular determination criterion. Accordingly, the number of information bits required for the user terminal to notify of the discovery signal transmission resource position at the next period is "4".

As shown in FIG. 4B, in consideration of frequency diversity, the same frequency resource as the discovery signal transmission resource selected at some period or its surrounding frequency resources are removed from candidates for selection of the next-period discovery signal transmission resource. For example, the surrounding frequency resources represent resources having the same frequency as that of the discovery signal transmission resource selected at some period and resources having frequencies adjacent to the frequency.

In the example as shown in FIG. 4B, candidate groups for the discovery signal transmission resource at the period (n+1) are defined, by removing the same frequency resource as the discovery signal transmission resource selected at the period (n) and its surrounding frequency resources from candidates. The discovery signal transmission resource at the period (n+1) is selected from among these candidates. At the period (n+1), again, the same frequency resource as the selected discovery signal transmission resource and its surrounding frequency resources are removed from candidates, and candidate groups for the discovery signal transmission resource at the period (n+2) are defined.

It is also possible to combine and use the above-mentioned methods of notifying of the information on discovery signal transmission resource at the next period and methods of decreasing the number of information bits in notifying of the information on discovery signal transmission resource at the next period.

As described above, the user terminal notifies also of the resource position to transmit the same discovery signal at the period (n+1) together in transmitting the discovery signal at the period (n), a user terminal receiving the discovery signal at the period (n) is thereby capable of knowing the resource position to which is assigned the same discovery signal at the period (n+1), and therefore, the user terminal on the receiving side is capable of synthesizing and receiving the discovery signal.

(Configuration of the Radio Communication System)

A configuration of the radio communication system according to this Embodiment will be described below. In the radio communication system, a radio communication method adopting the above-mentioned Type 1 discovery is applied.

Figure 5:
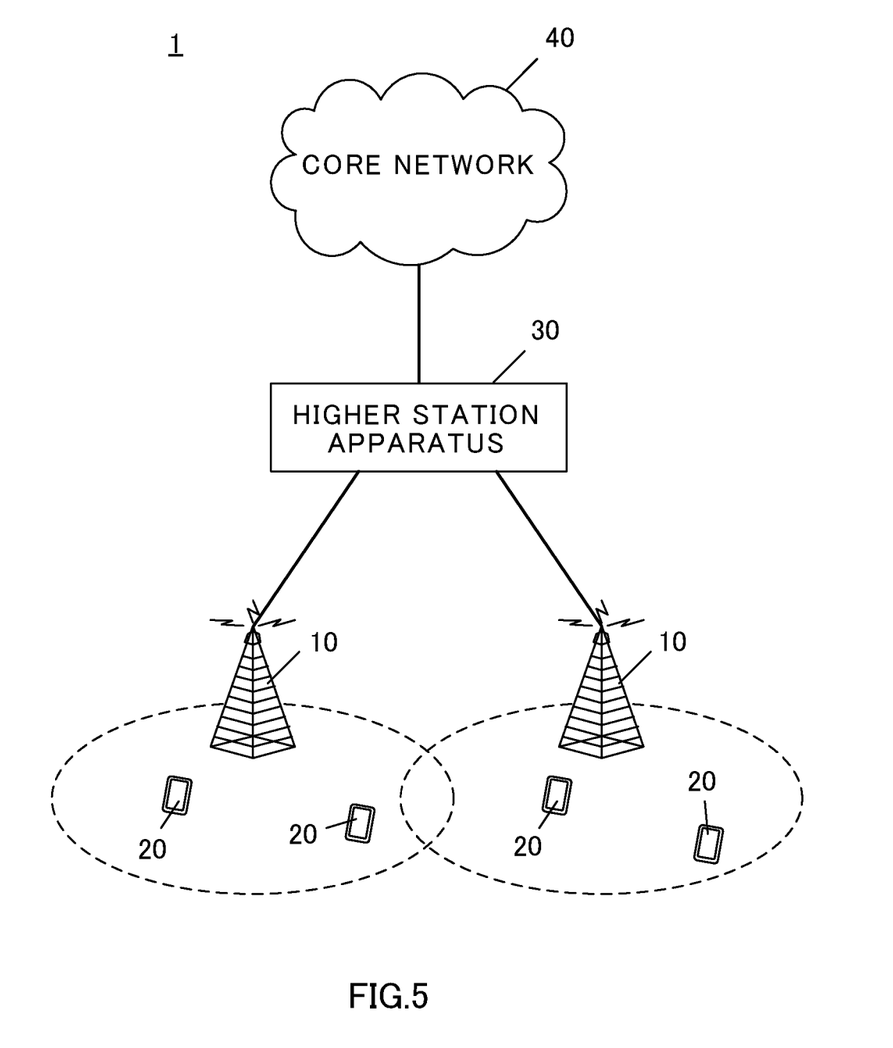
FIG. 5 is a diagram showing one example of a schematic configuration of a radio communication system according to this Embodiment.

FIG. 5 is a schematic configuration diagram showing one example of the radio communication system according to this Embodiment. As shown in FIG. 5, the radio communication system 1 is provided with a plurality of radio base stations 10, and a plurality of user terminals 20 which is present inside a cell formed by each radio base station 10 and is configured to be able to communicate with each radio base station 10. Each of the radio base stations 10 is connected to a higher station apparatus 30, and is connected to a core network 40 via the higher station apparatus 30.

The radio base station 10 is a radio base station having predetermined coverage. In addition, the radio base station 10 may be a macro base station (eNodeB, macro base station, collection node, transmission point, transmission/reception point) having relatively wide coverage, or may be a small base station (small base station, pico-base station, femto-base station, HeNB (Home eNodeB), RRH (Remote Radio Head), micro-base station, transmission point, transmission/reception point) having local coverage.

The user terminal 20 is a terminal supporting various types of communication schemes such as LTE and LTE-A, and may include a fixed communication terminal as well as the mobile communication terminal. The user terminal 20 is capable of executing communications with another user terminal 20 via the radio base station 10. Further, the user terminal 20 is capable of executing inter-terminal direct signal transmission/reception (D2D signal transmission/reception) from/to another user terminal 20 by bypassing the radio base station 10.

For example, the higher station apparatus 30 includes an access gateway apparatus, Radio Network Controller (RNC), Mobility Management Entity (MME) and the like, but is not limited thereto.

As downlink channels, in the radio communication system 1 are used a downlink shared channel (PDSCH: Physical Downlink Shared Channel) shared by user terminals 20, downlink control channels (PDCCH: Physical Downlink Control Channel, EPDCCH: Enhanced Physical Downlink Control Channel), broadcast channel (PBCH) and the like. User data, higher layer control information, and predetermined SIB (System Information Block) are transmitted on the PDSCH. Downlink control information (DCI) is transmitted on the PDCCH and EPDCCH.

As uplink channels, in the radio communication system 1 are used an uplink shared channel (PUSCH: Physical Uplink Shared Channel) shared by user terminal 20, uplink control channel (PUCCH: Physical Uplink Control Channel) and the like. User data and higher layer control information is transmitted on the PUSCH.

In the radio communication system 1, on uplink, discovery signals to mutually detect terminals are transmitted between user terminals 20.

Figure 6:
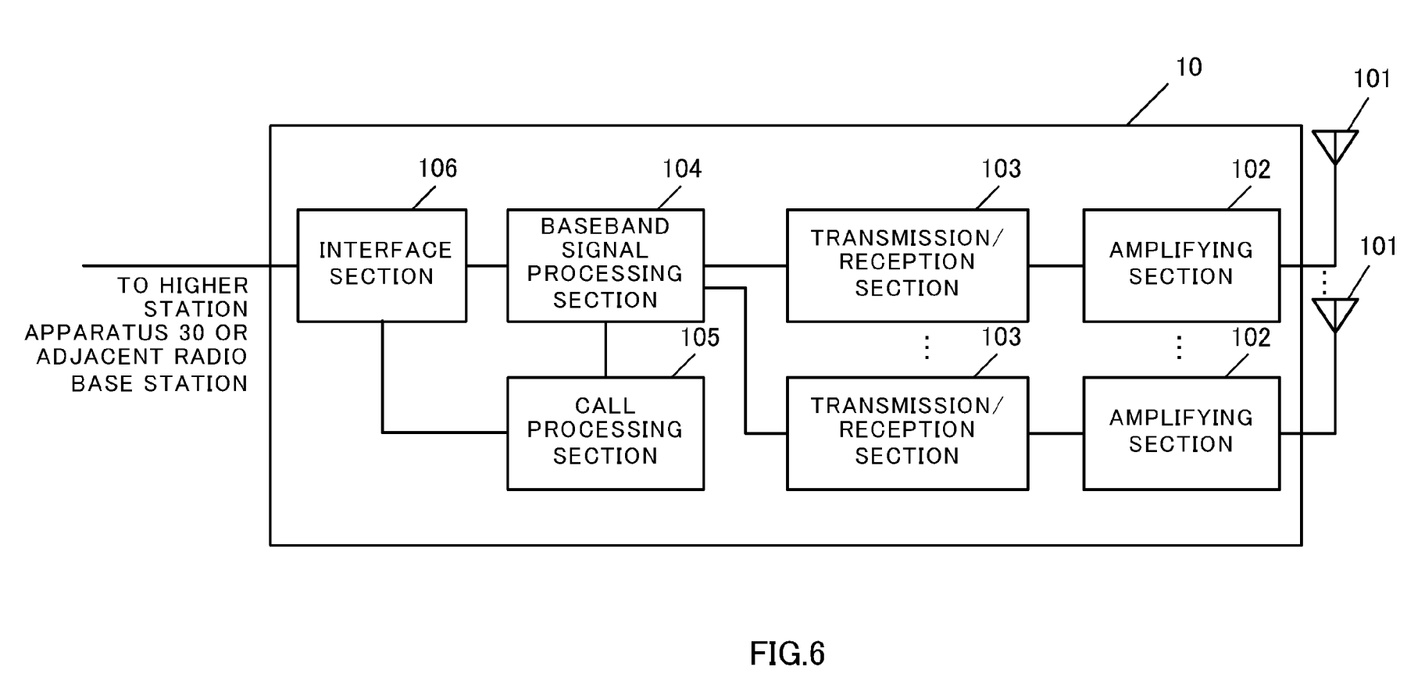
FIG. 6 is a diagram showing one example of an entire configuration of a radio base station according to this Embodiment.

FIG. 6 is an entire configuration diagram of the radio base station 10 according to this Embodiment. As shown in FIG. 6, the radio base station 10 is provided with a plurality of transmission/reception antennas 101 for MIMO transmission, amplifying sections 102, transmission/reception sections 103, baseband signal processing section 104, call processing section 105, and interface section 106.

User data to transmit to the user terminal 20 from the radio base station 10 on downlink is input to the baseband signal processing section 104 from the higher station apparatus 30 via the interface section 106.

The baseband signal processing section 104 performs, on the input user data, processing of PDCP layer, segmentation and concatenation of the user data, transmission processing of RLC (Radio Link Control) layer such as transmission processing of RLC retransmission control, MAC (Medium Access Control) retransmission control, for example, transmission processing of HARQ, scheduling, transmission format selection, channel coding, Inverse Fast Fourier Transform (IFFT) processing, and precoding processing to transfer to each of the transmission/reception sections 103. Further, also concerning a downlink control signal, the section 104 performs transmission processing such as channel coding and Inverse Fast Fourier Transform on the signal to transfer to each of the transmission/reception sections 103.

Each of the transmission/reception sections 103 converts the downlink signal, which is subjected to precoding for each antenna and is output from the baseband signal processing 104, into a signal with a radio frequency band. The amplifying sections 102 amplify the radio-frequency signal subjected to frequency conversion, and transmit from the transmission/reception antennas 101. Each of the transmission/reception sections 103 notifies each user terminal 20 of the D2D discovery resource group.

On the other hand, for an uplink signal, a radio-frequency signal received in each of the transmission/reception antennas 101 is amplified in respective one of the amplifying sections 102, is subjected to frequency conversion in respective one of the reception sections 103 and is thereby converted into a baseband signal, and the signal is input to the baseband signal processing section 104.

For user data included in the input uplink signal, the baseband signal processing section 104 performs FFT processing, IDFT processing, error correcting decoding, reception processing of MAC retransmission control, and reception processing of RLC layer and PDCP layer to transfer to the higher station apparatus 30 via the interface section 106. The call processing section 105 performs call processing such as setting and release of a communication channel, state management of the radio base station 10, and management of radio resources.

The interface section 106 transmits and receives (backhaul signaling) signals to/from an adjacent radio base station via the inter-base station interface (for example, optical fiber, X2 interface). Alternatively, the interface section 106 transmits and receives signals to/from the higher station apparatus 30 via a predetermined interface.

Figure 7:
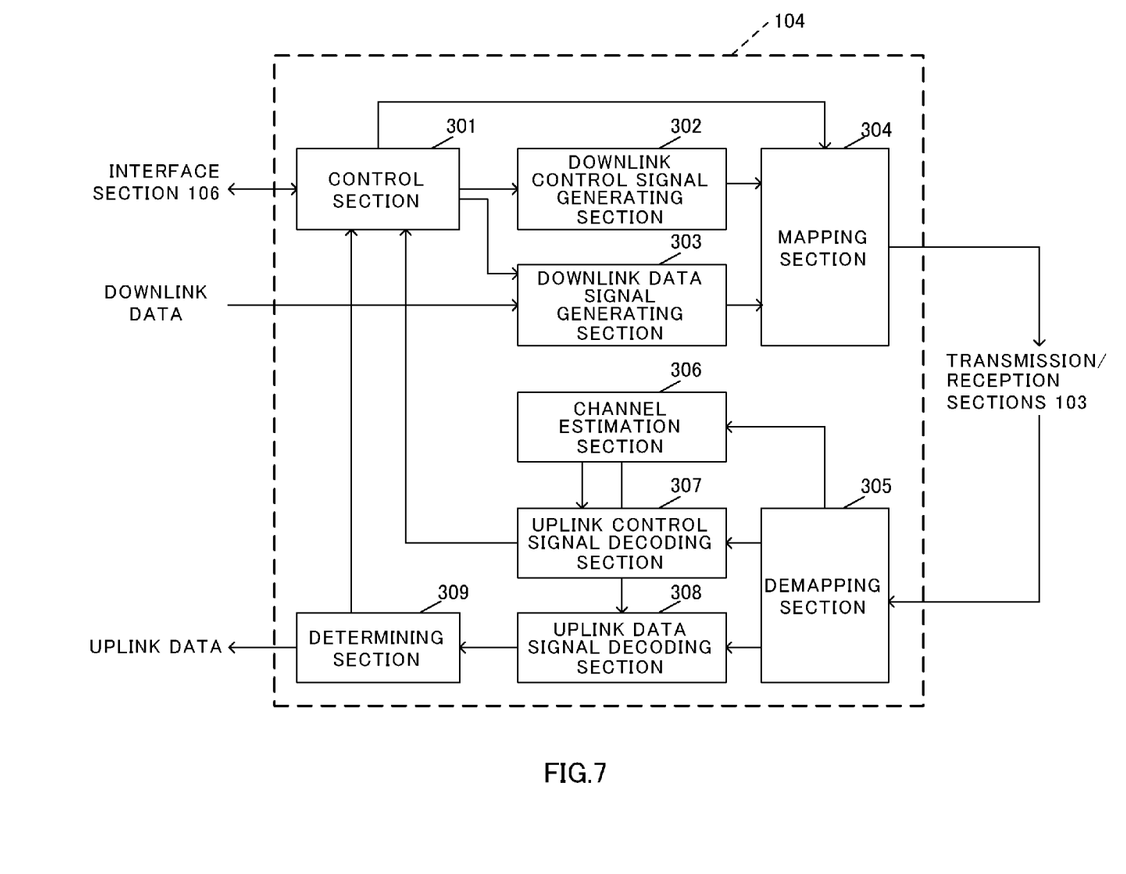
FIG. 7 is a diagram showing one example of a function configuration of the radio base station according to this Embodiment.

FIG. 7 is a principal function configuration diagram of the baseband signal processing section 104 that the radio base station 10 has according to this Embodiment. As shown in FIG. 7, the baseband signal processing section 104 that the radio base station 10 has includes at least a control section 301, downlink control signal generating section 302, downlink data signal generating section 303, mapping section 304, demapping section 305, channel estimation section 306, uplink control signal decoding section 307, uplink data signal decoding section 308, and determining section 309 to be comprised thereof.

The control section 301 controls scheduling of the downlink user data transmitted on the PDSCH, and the downlink control information, downlink reference signal and the like transmitted on both or one of the PDCCH and Enhanced PDCCH (EPDCCH). Further, the control section 301 performs control (assignment control) of scheduling of RA preamble transmitted on the PRACH, uplink data transmitted on the PUSCH, and uplink control information and uplink reference signal transmitted on the PUCCH or PUSCH. Information on the assignment control of the uplink signal (uplink control signal, uplink user data) is notified to the user terminal 20 using the downlink control signal (DCI).

The control section 301 controls the allocation of radio resources to the downlink signal and uplink signal, based on instruction information from the higher station apparatus 30 and feedback information from each user terminal 20. In other words, the control section 301 has a function as a scheduler.

The downlink control signal generating section 302 generates the downlink control signal (both or one of the PDCCH signal and EPDCCH signal) of which assignment is determined in the control section 301. Specifically, based on instructions from the control section 301, the downlink control signal generating section 302 generates DL assignment for notifying of downlink signal assignment information and UL grant for notifying of uplink signal assignment information.

The downlink data signal generating section 303 generates the downlink data signal (PDSCH signal) with assignment to resources determined in the control section 301. The data signal generated in the downlink data signal generating section 303 is subjected to coding processing and modulation processing according to a coding rate and modulation scheme determined based on CSI from each user terminal 20 and the like.

Based on instructions from the control section 301, the mapping section 304 controls the assignment of the downlink control signal generated in the downlink control signal generating section 302 and downlink data signal generated in the downlink data signal generating section 303 to radio resources.

The demapping section 305 demaps the uplink signal transmitted from the user terminal 20 to divide the uplink signal. The channel estimation section 306 estimates a channel state from a reference signal included in the received signal divided in the demapping section 305, and outputs the estimated channel state to the uplink control signal decoding section 307 and uplink data signal decoding section 308.

The uplink control signal decoding section 307 decodes a feedback signal (receipt confirmation signal or the like) transmitted from the user terminal on the uplink control channel (PRACH, PUCCH) to output to the control section 301. The uplink data signal decoding section 308 decodes the uplink data signal transmitted from the user terminal on the uplink shared channel (PUSCH) to output to the determining section 309. Based on the decoding result of the uplink data signal decoding section 308, the determining section 309 makes a retransmission control determination (A/N determination) and outputs the result to the control section 301.

Figure 8:
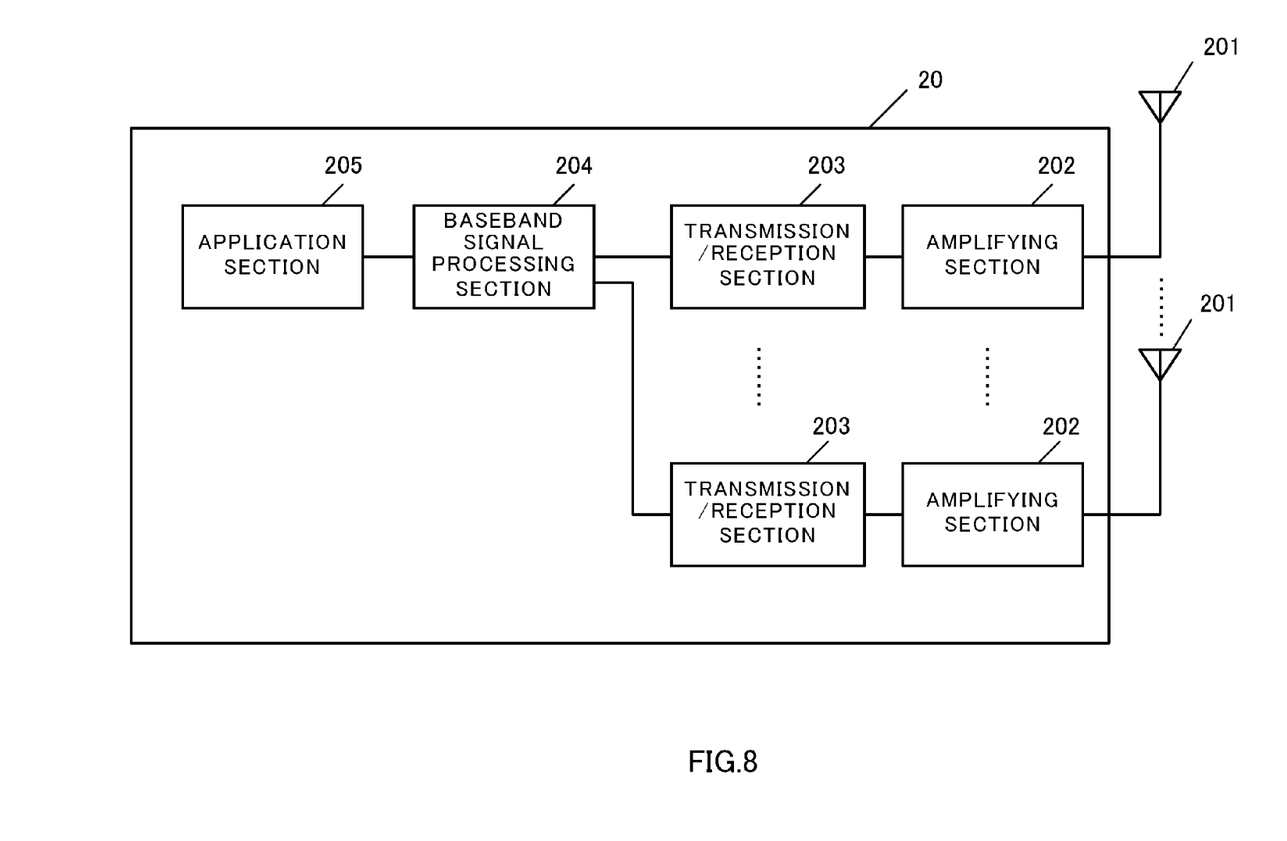
FIG. 8 is a diagram showing one example of an entire configuration of a user terminal according to this Embodiment.

FIG. 8 is an entire configuration diagram of the user terminal 20 according to this Embodiment. As shown in FIG. 8, the user terminal 20 is provided with a plurality of transmission/reception antennas 201 for MIMO transmission, amplifying sections 202, transmission/reception sections (reception section) 203, baseband signal processing section 204, and application section 205.

For downlink data, radio-frequency signals received in a plurality of transmission/reception antennas 201 are respectively amplified in the amplifying sections 202, and are subjected to frequency conversion in the transmission/reception sections 203 to be baseband signals. The baseband signal is subjected to FFT processing, error correcting decoding, reception processing of retransmission control and the like in the baseband signal processing section 204. Among the downlink data, downlink user data is transferred to the application section 205. The application section 205 performs processing concerning layers higher than physical layer and MAC layer, and the like. Further, among the downlink data, broadcast information is also transferred to the application section 305.

On the other hand, for uplink user data, the data is input to the baseband signal processing section 204 from the application section 205. The baseband signal processing section 204 performs transmission processing of retransmission control (HARQ: Hybrid ARQ), channel coding, precoding, DFT processing, IFFT processing and the like to transfer to each of the transmission/reception sections 203. Each of the transmission/reception sections 203 converts the baseband signal output from the baseband signal processing section 204 into a signal with a radio frequency band. Subsequently, each of the amplifying sections 202 amplifies the radio-frequency signal subjected to frequency conversion to transmit from respective one of the transmission/reception antennas 201.

The transmission/reception section 203 receives information on the D2D discovery resource group from the radio base station 10. The transmission/reception section 203 functions as a transmission section that transmits the discovery signal of D2D discovery in D2D signal transmission/reception and the information on discovery signal transmission resource at the next period together. The transmission/reception section 203 receives the discovery signal transmitted from another user terminal, and further, transmits/receives signals in communications between terminals.

Figure 9:
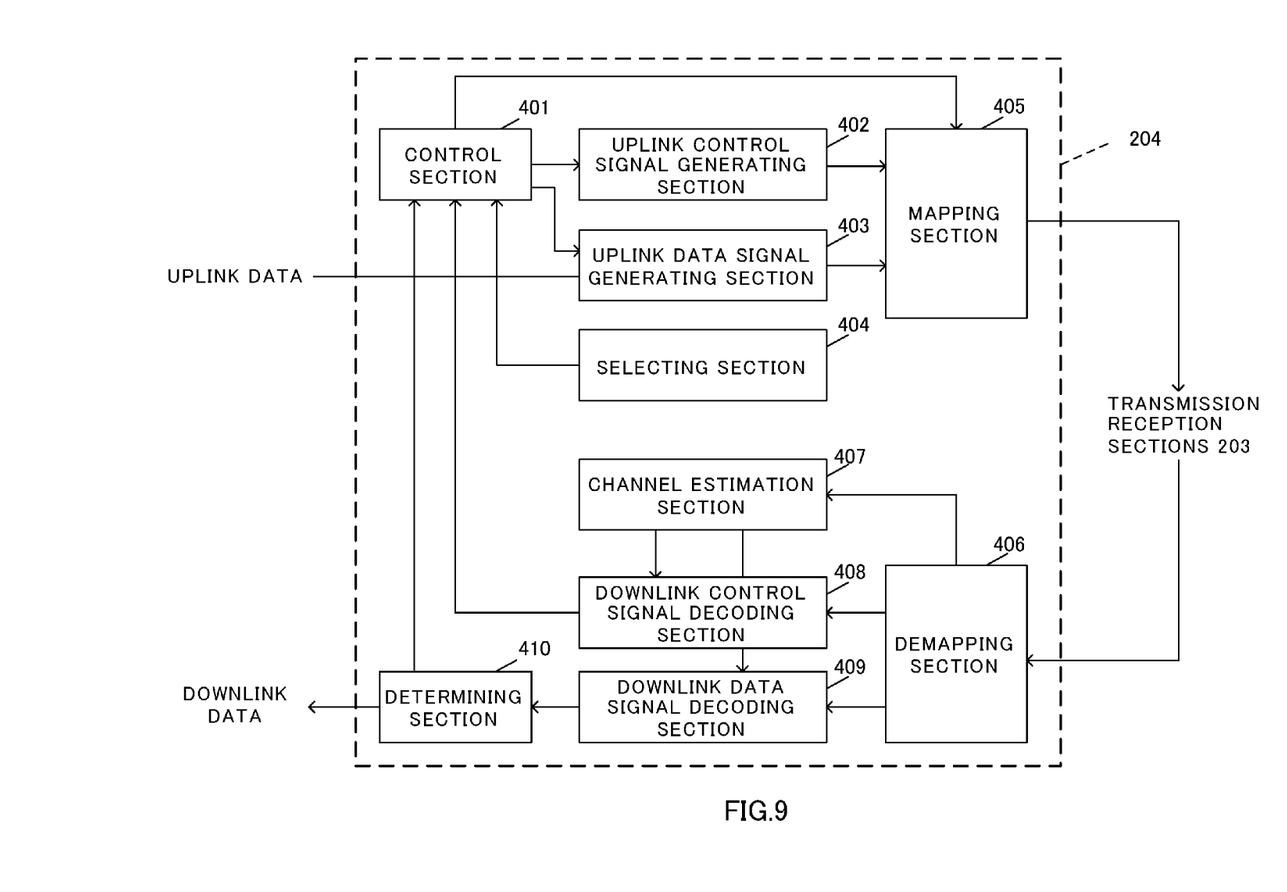
FIG. 9 is a diagram showing one example of a function configuration of the user terminal according to this Embodiment.

FIG. 9 is a principal function configuration diagram of the baseband signal processing section 204 that the user terminal 20 has. As shown in FIG. 9, the baseband signal processing section 204 that the user terminal 20 has includes at least a control section 401, uplink control signal generating section 402, uplink data signal generating section 403, selecting section 404, mapping section 405, demapping section 406, channel estimation section 407, downlink control signal decoding section 408, downlink data signal decoding section 409 and determining section 410 to be comprised thereof.

Based on the downlink control signal (PDCCH signal) transmitted from the radio base station and a retransmission control determination result with respect to the received PDSCH signal, the control section 401 controls generation of an uplink control signal (A/N signal and the like) and uplink data signal. The downlink control signal received from the radio base station is output from the downlink control signal decoding section 408, and the retransmission control determination result is output from the determining section 410.

Based on instructions from the control section 401, the uplink control signal generating section 402 generates an uplink control signal (receipt confirmation signal and feedback signal such as channel state information (CSI)). Based on instructions from the control section 401, the uplink data signal generating section 403 generates an uplink data signal. In addition, when an UL grant is included in the downlink control signal notified from the radio base station, the control section 401 instructs the uplink data signal generating section 403 to generate an uplink data signal.

In performing Type 1 discovery, the selecting section 404 selects the discovery signal transmission resource at the next period from the D2D discovery resource group for each period. The selecting section 404 outputs the selection result of the discovery signal transmission resource at the next period to the control section 401.

Based on instructions from the control section 401, the mapping section 405 controls the assignment of the uplink control signal (receipt confirmation signal and the like) and uplink data signal to radio resources (PUCCH, PUSCH). Based on instructions from the control section 401, the mapping section 405 controls the assignment of the discovery signal in D2D discovery and information on discovery signal transmission resource at the next period to resources selected in the selecting section 404.

The demapping section 406 demaps the downlink signal transmitted from the radio base station 10 to divide the downlink signal. The channel estimation section 407 estimates a channel state from a reference signal included in the received signal divided in the demapping section 406, and outputs the estimated channel state to the downlink control signal decoding section 408 and downlink data signal decoding section 409.

The downlink control signal decoding section 408 decodes the downlink control signal (PDCCH signal) transmitted on the downlink control channel (PDCCH), and outputs scheduling information (information on assignment to uplink resources) to the control section 401. Further, also when the downlink control signal includes information on a cell to which a receipt confirmation signal is transmitted as feedback, and information on whether or not to apply RF adjustments, the section 408 outputs the information to the control section 401.

The downlink data signal decoding section 409 decodes the downlink data signal transmitted on the downlink shared channel (PDSCH) to output to the determining section 410. Based on the decoding result in the downlink data signal decoding section 409, the determining section 410 makes a retransmission control determination (A/N determination), and outputs the result to the control section 401.

Based on discovery signals of D2D discovery transmitted from other user terminals 20, the control section 401 detects another communicable user terminal 20. Based on the information on discovery signal transmission resource at the next period transmitted from another user terminal 20 together with the discovery signal, the section 401 controls synthesis reception of the discovery signal transmitted from the another user terminal 20.

In addition, the present invention is not limited to the above-mentioned Embodiment, and is capable of being carried into practice with various modifications thereof. In the above-mentioned Embodiment, the size, shape and the like shown in the accompanying drawings are not limited thereto, and are capable of being modified as appropriate within the scope of exhibiting the effects of the invention. Further, the invention is capable of being carried into practice with modifications thereof as appropriate without departing from the scope of the object of the invention.

The present application is based on Japanese Patent Application No. 2014-015979 filed on Jan. 30, 2014, entire content of which is expressly incorporated by reference herein.

The invention claimed is:

1. A user terminal capable of executing inter-terminal direct signal transmission/reception, comprising:
a selecting section that selects a discovery signal transmission resource of a next period for each period; and
a transmission section that transmits for each period a discovery signal using a discovery signal transmission resource of a present period and information indicating the discovery signal transmission resource of the next period,
wherein the transmission section either: assigns the information to a resource in a resource group independent of a discovery signal transmission resource group notified from a network to transmit; or transmits the information using a preamble sequence signal that is different from a signal used for transmitting the discovery signal.

2. The user terminal according to claim 1, wherein a position of a resource to which the discovery signal is assigned in the discovery signal transmission resource group and a position of a resource to which the information is assigned in the independent resource group are corresponding positions in both of resource groups.

3. The user terminal according to claim 1, wherein the transmission section transmits the information using a signal that is the same signal as a signal to transmit the discovery signal and that has an extremely low coding rate.

4. The user terminal according to claim 1, wherein the selecting section divides the discovery signal transmission resource group notified from a network into an arbitrary number of sub-groups, and autonomously selects the discovery signal transmission resource of the next period from one of the sub-groups for each period.

5. The user terminal according to claim 1, wherein the selecting section autonomously selects the discovery signal transmission resource of the next period from a resource candidate group positioned in a relative position beforehand defined with respect to a discovery signal transmission resource position selected at some period.

6. A radio communication system including a user terminal capable of executing inter-terminal direct signal transmission/reception and a radio base station capable of communicating with the user terminal,
wherein the radio base station is provided with a transmission section that notifies the user terminal of a discovery signal transmission resource group, and
the user terminal has a selecting section that autonomously selects a discovery signal transmission resource of a next period from the discovery signal transmission resource group for each period, and
a transmission section that transmits for each period a discovery signal using a discovery signal transmission resource of a present period and information indicating the discovery signal transmission resource of the next period,
wherein the transmission section either: assigns the information to a resource in a resource group independent of the discovery signal transmission resource group notified from a network to transmit; or transmits the information using a preamble sequence signal that is different from a signal used for transmitting the discovery signal.

7. A radio communication method of a user terminal capable of executing inter-terminal direct signal transmission/reception, comprising:
selecting, by a processor of the user terminal, a discovery signal transmission resource of a next period for each period; and
transmitting, by a transmitter of the user terminal, for each period a discovery signal using a discovery signal transmission resource of a present period and information indicating the discovery signal transmission resource of the next period,
wherein the transmission section either: assigns the information to a resource in a resource group independent of a discovery signal transmission resource group notified from a network to transmit; or transmits the information using a preamble sequence signal that is different from a signal used for transmitting the discovery signal.

* * * * *